United States Patent
Nomura et al.

[15] 3,654,425
[45] Apr. 4, 1972

[54] AUTOMATIC WELDING APPARATUS WITH PATH FOLLOWER

[72] Inventors: Hirokazu Nomura; Michio Mimura; Yoshiyuki Ono, all of Yokohama, Japan

[73] Assignee: Nippon Kokan Kabushiki Kaisha, Tokyo, Japan

[22] Filed: June 9, 1970

[21] Appl. No.: 45,092

[30] Foreign Application Priority Data

Sept. 29, 1969 Japan.................................44/92038

[52] U.S. Cl. .......................................219/125 PL, 228/45
[51] Int. Cl. .......................................................B23k 9/12
[58] Field of Search..............219/124, 125 R, 125 PL, 126, 219/60, 61, 137; 228/32, 45

[56] References Cited

UNITED STATES PATENTS

| | | | |
|---|---|---|---|
| 3,444,352 | 5/1969 | Ogden et al............................ | 219/125 |
| 3,473,001 | 10/1969 | Oertel................................... | 219/125 |
| 3,167,636 | 1/1965 | Bosteels................................ | 219/125 |
| 2,068,166 | 1/1937 | Dodge................................... | 219/125 |
| 3,005,901 | 10/1961 | King..................................... | 219/125 |
| 2,836,704 | 5/1958 | Mason................................... | 219/125 |
| 3,373,914 | 3/1968 | Wall, Jr................................. | 219/125 X |

Primary Examiner—J. V. Truhe
Assistant Examiner—L. A. Schutzman
Attorney—Steinberg & Blake

[57] ABSTRACT

An automatic welding apparatus wherein a relatively small portable assembly can be situated at a selected location for efficiently carrying out relatively light welding operations. A single elongated rail supports a carriage for movement parallel to the path which is to receive the weld, and this rail is received in bores of supporting leg structures. The rail has teeth, and one of the leg structures, at least, has a swingable lever provided with teeth meshing with those of the rail for releasably locking the latter and the supporting leg structure with respect thereto.

The carriage has adjustably fixed thereto a bracket which slidably supports a structure which carries a welding unit, a wire feeder for feeding welding wire to the unit, and guide rollers for guiding the unit along the path as the carriage is driven along the rail.

11 Claims, 5 Drawing Figures

PATENTED APR 4 1972

INVENTORS
HIROKAZU NOMURA
BY MICHIO MIMURA
YOSHIYUKI ONO
Stanberg & Blake
ATTORNEYS

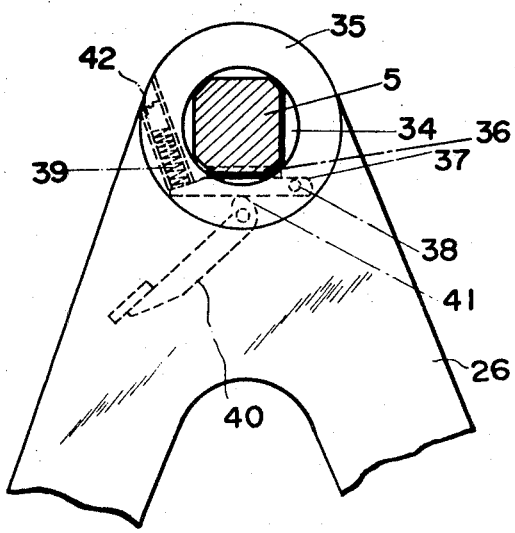
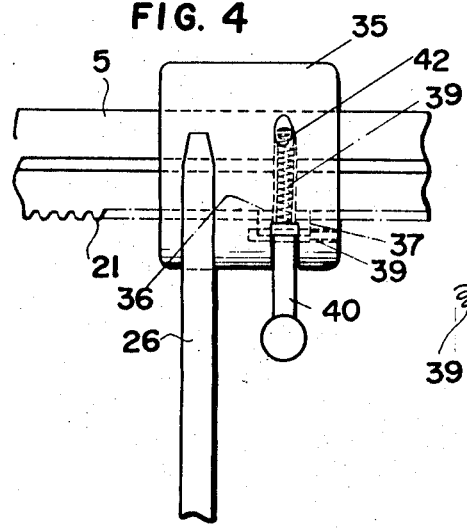
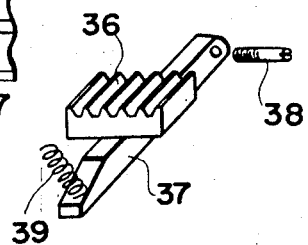

AUTOMATIC WELDING APPARATUS WITH PATH FOLLOWER

BACKGROUND OF THE INVENTION

The present invention relates to welding apparatus.

In particular the present invention relates to automatic welding apparatus where structure will operate automatically to distribute a weld along a predetermined path.

Of the known different types of welding, shielded or submerged arc automatic welding is considered to be a highly efficient welding technique. However, at the present time automatic welders capable of utilizing this shielded arc type of welding are fairly massive, requiring substantial cranes and other heavy structures to bring about the required support and movement of the welding components. When welding at locations requiring relatively light welds, as for example a weld which may be as short at 3 – 5 m., it becomes necessary with the known constructions to utilize a crane even though the welding job is a small, light job which does not require such heavy structures. The same considerations apply during fillet welding of frameworks and steel plates or blocks, particularly in relatively tight locations where access of a crane is difficult. The result is that with known structures, designed for large-scale welding operations, operations of relatively small efficiency are only possible when dealing with relatively small-scale welding.

The result was that automatic welding apparatus of this latter type simply was not used in situations of the type referred to above, and instead in this latter type of situation use is made of hand-operated welding apparatus such as gravity welding structures, with consequent inefficiencies. While this latter type of apparatus is used fairly frequently because one operator can operate three or four of the units simultaneously, nevertheless these units can utilize only welding rods of limited length, so that the operations must be frequently interrupted, with consequent loss of time, in order to bring about the required change of the welding rod. Thus, disadvantageous inefficiencies are necessarily inherent in these known methods.

SUMMARY OF THE INVENTION

It is accordingly a primary object of the present invention to provide an automatic welding apparatus which will avoid the above drawbacks.

In particular, it is an object of the invention to provide a relatively light-weight, portable automatic welding apparatus which can carry out efficient welding operations in an automatic manner in situations where the large conventional automatic apparatus cannot be used with any appreciable efficiency.

In particular, it is an object of the invention to provide an automatic welding apparatus of this type which can automatically adapt itself to irregularities which are encountered along the welding path.

Furthermore, it is an object of the invention to provide a construction of this type which lends itself to adjustment for enabling the supporting structure to be adapted to the particular conditions which are encountered on a given job.

It is especially an object of the invention to provide a construction of this type which while adjustable so that the structure can be adapted to different conditions which are encountered during operation, nevertheless will reliably retain its suggested position so as to maintain the efficiency of the automatic operation throughout the entire welding cycle.

With the apparatus of the invention a welding unit is provided for welding with wire which is fed to the welding unit. A wire feeding means is provided for feeding the wire to the welding unit, and a guide means is provided for guiding the unit along a welding path. A support means carries the wire feeding means, the welding unit, and the guide means. A bracket means carries the support means and mounts it for free movement toward and away from the welding path so that the entire structure can adapt itself to irregularities which may be encountered along the welding path. The bracket means is itself adjustably fixed to a carriage means which is movable along a guide rail means, a suitable drive being provided for automatically advancing the carriage means along the rail means. This rail means preferably takes the form of a single elongated rail carried by end frame means at least one of which is in the form of a supporting leg assembly having a portion formed with an opening through which the single rail extends. This rail is formed with teeth, and the part of the leg assembly which receives the rail swingably carries a lever having teeth meshing with those of the rail for releasably locking the latter to the supporting leg assembly, so that the latter can be adjusted along the rail and then releasably locked thereto at a selected location.

BRIEF DESCRIPTION OF DRAWINGS

The invention is illustrated by way of example in the accompanying drawings which form part of this application and in which:

FIG. 3 is a fragmentary transverse sectional elevation taken through a guide rail of the invention and showing how it is supported on a leg assembly which forms an end frame means;

FIG. 4 is a fragmentary front elevation of the structure of FIG. 3 as seen from the left of FIG. 3, FIG. 4 illustrating the structure on a scale somewhat reduced with respect to the scale of FIG. 3; and FIG. 5 is a perspective exploded illustration of a toothed swing-lever, and a pivot and spring associated therewith, this lever forming part of the structure illustrated in FIGS. 3 and 4.

DESCRIPTION OF PREFERRED EMBODIMENTS

Figure 1:
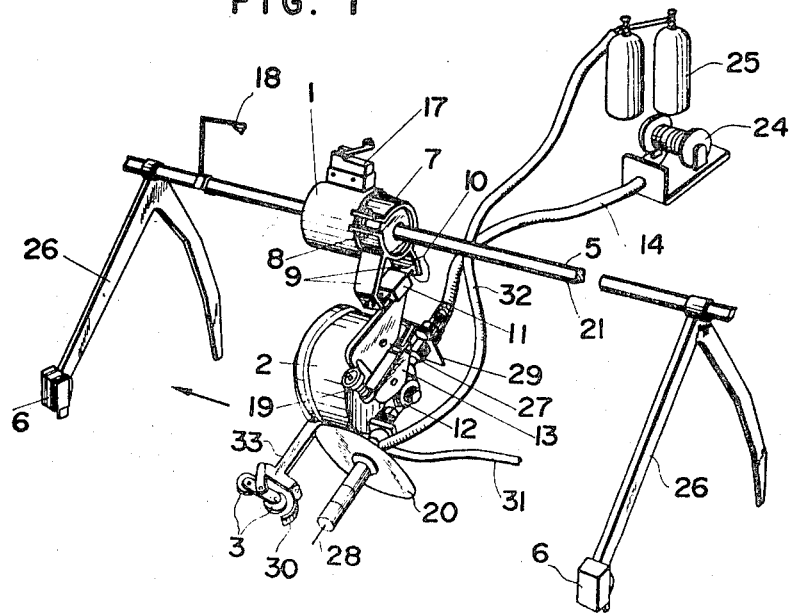
FIG. 1 is a partly schematic perspective illustration of a portable welding apparatus according to the invention.
Figure 2:
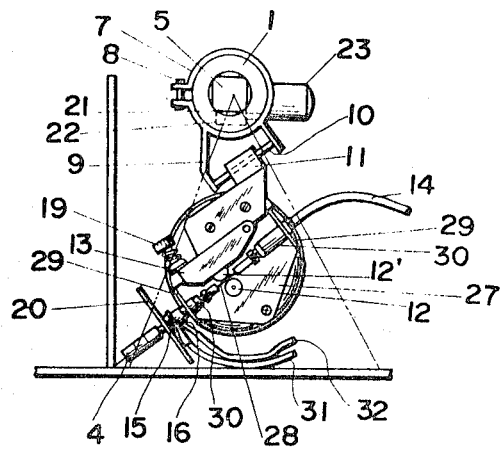
FIG. 2 is a schematic side elevation showing the end frame means in phantom lines so as to clearly illustrate the structure supported therebetween.

Referring now to the particular example of the invention which is illustrated in the drawings, there is illustrated in FIGS. 1 and 2 a carriage means 1 in the form of an elongated body formed with a central bore passing therethrough. An elongated rail means 5, in the form of a single rail of octagonal cross section in the illustrated example passes through the central bore of the elongated tubular carriage 1 so as to support the latter for movement along the axis of the single guide rail 5. This guide rail 5 is supported, in the region of its ends, for example, on a pair of end frame means 26 each of which takes the form of a leg assembly of substantially inverted V-shaped configuration with the upper portions of these assemblies 26 being formed with bores which receive the rail 5. Although it is possible to provide constructions where both of the end frame means 26 are movable axially along the rail 5 so that the distance between the end frame means 26 can be adjusted, it is only important that at least one of these end frame means 26 be axially movable along the rail 5 while the other end frame means 26 can be fixed to the rail 5.

A drive means is provided for driving the carriage means 1 along the rail means 5. For this purpose the rail means 5 is formed along its bottom surface with teeth forming a rack 21. A pinion 22 (FIG. 2) of the drive means meshes with the rack 21 and is driven by a motor 23 which is directly carried by the carriage means 1 and connected in any suitable way to a source of electrical energy which can be turned on and off by the operator, so that when the motor 23 is energized the pinion 22 will coact with the rack 21 for moving the carriage means 1 along the rail means 5, and the parts are designed so that during an operating cycle when welding operations are taking place the carriage means 1 is driven by this drive means to the left, as viewed in FIG. 1 and as is indicated by the arrow in FIG. 1.

A bracket means 7 is provided for supporting the additional welding structure referred to below from the carriage means 1. It will be noted that because the rack 21 meshes with the pinion 22 which is driven from the motor 23 which in turn is carried by the carriage means 1, this carriage means 1 cannot turn about the axis of the rail 5 and is thus constrained only to move along the axis thereof. However, the bracket means 7 is in the form of a springy ring-shaped band having a pair of free ends which can be drawn tightly toward each other by the bolt 8. Thus by manipulation of the bolt 8 it is possible to loosen the bracket 7 and mount it at any selected angular position about the axis of the rail 5 on the carriage means 1. Thus the carriage means 1 has at its right end, as viewed in FIG. 1, an exterior surface forming part of a cylinder of circular section and receiving the springy band which forms part of the bracket means 7, so that through the bolt 8 it is possible to adjustably fix the bracket means 7 on the carriage means at a selected angular position.

The bracket means 7 includes a pair of arms 9 projecting outwardly from the circular band portion which grips the carriage means 1, and a pair of elongated rods 10 extend between and are fixed to the arms 9, these rods 10 being parallel to each other.

The rods 10 extend slidably through a pair of parallel bores formed in a slide block 11 of a support means 27. Thus, this support means 27 is in the form of a plate situated in a vertical plane and fixed at its upper end region to the block 11 which can slide freely along the rods 10.

The support means 27 carries on one side a motor 2 which forms part of a wire-feeding means for feeding filler wire to the path where the weld is to be received. Thus it will be seen that because of the possibility of adjustably fixing the bracket means 7 to the carriage means 1 it is possible to situate the wire-feeding motor 2 at almost any preselected attitude or position with respect to the carriage means 1, such as horizontally aligned therewith, at any angular relation thereto, or even directly below the carriage means 1. In addition the coaction between the rods 10 and block 11 enables the wire-feeding motor 2 to move freely toward and away from the carriage 1.

The wire-feeding means includes in addition to the motor 2 a feed roller 12 driven by the motor 2 and situated at the side of the plates 27 opposite from the motor 2. The wire-feeding roller 12 is situated beneath the wire 28 while an upper feed roller 12' is situated over the wire 28 and above the roller 12. This upper roller 12' (FIG. 2) is supported for rotary movement on a swingable plate 13 which is pivotally supported at its right end, as viewed in FIG. 2, on the support means 27. At its left end, as viewed in FIG. 2, the swing-plate 13 is urged downwardly by a spring 19 compressed between the front end of the plate 13 and a lug fixed to and projecting from the support plate 27. In this way, the upper roller 12' is urged downwardly toward the lower roller 12, so that when the latter is driven, the wire 28 will be nipped between the rollers 12 and 12' to be fed downwardly toward the left, as viewed in FIG. 2. Thus, the motor 2 drives the lower roller 12 of FIG. 2 in a counterclockwise direction, as viewed in FIG. 2.

The support means 27 also has a pair of parallel lugs 29 formed with openings aligned with a pair of tubular guides 30 which are carried by the lugs 29, and the wire 28 moves through the guide cylinders 30 which are carried by the lugs 29 of the support means 27.

In addition to this wire-feeding means, the support means 27 carries a welding unit which includes an electricity-charging component 15 through which the wire 28 passes. Also, the welding unit includes a gas-shielding component 16 and a nozzle 4 provided with a plate 20 for shielding against arc spatter. The wire 28 reaches the first guide cylinder 30 through a guide or wire-feeding tube 14 which in turn receives the wire from a supply reel or spool 24. Therefore, as the wire is consumed, it is fed to the welding location by the above wire-feeding means and is withdrawn from the supply spool 24.

A guide means is also carried by the support means for guiding the welding unit along the path which is to receive the weld, this guide means being situated along this path just in advance of the welding unit. In the illustrated example, this guide means is formed by a pair of guide rollers 3 supported for rotary movement on a bracket carried by a supporting leg 33. This leg 33 is fixed to and carried by the support means by way of the housing of the motor 2 in the illustrated example where, for example, the leg 33 projects radially from a circular band fixed to the exterior of the housing of the motor 2, this housing forming an extension of and in fact a part of the support means 27 since it is rigid therewith. Between the guide rollers 3 and the tip of the welding unit where the nozzle 4 is located and where the welding takes place there is a shielding plate or strip 30 which prevents any of the weld material from splattering onto the rollers 3.

The pair of end frame means 26 fixedly carry at their lower front ends electromagnets 6 connected through an unillustrated circuit to a source of electricity so that when the circuit is closed these electromagnets 6 will become energized to releasably hold the entire apparatus automatically against the work by the magnetic attraction of the electromagnets 6.

The circuit of the motor 23 for driving the carriage means 1 along the rail 5 includes a microswitch 17 in the path of which is a switch-actuating member 18. This member 18 is supported on a sleeve slidable along the rail 5 so that the location of the actuator 18 can be adjusted. This location will be set according to the length of the weld which is desired. When the switch 17 reaches the actuator 18, this actuator will actuate the switch 17 to open the circuit of the motor 23 and thus terminate the drive and end the welding operation.

Electrical energy is supplied to the welding unit through a cable 31 connected to any suitable source of electrical energy. The shielding gas is delivered to the area where the welding takes place through a tube 32 which through suitable valves is connected to a pair of tanks 25 which are supplied with the shielding gas.

FIG. 2 illustrates how the above-described automatic welding apparatus of the invention is used in providing a fillet weld between horizontal and vertical plates. The vertical plate is held in any suitable way in the position illustrated in FIG. 2 where it projects perpendicularly from the horizontal plate at the upper surface of the latter. The leg structures 26 are adjusted so as to accommodate the work therebetween with the rail 5 extending horizontally over the horizontal plate to the right of the vertical plate, as illustrated in FIG. 2. Now the bracket means 7 is adjusted so that the guide means formed by the rollers 3 will be situated precisely at the intersection between the vertical and horizontal plates with the nozzle 4 of the welding unit properly directed toward the intersection forming the path along which the weld is to be distributed. With the parts properly positioned, the electromagnets 6 are energized so that the end frame means 26 are held in a fixed relation with respect to the work, and the tip of the filler wire 28 is located precisely at the intersection where the fillet weld is to be deposited. The guide rollers 3 will roll along the intersection between the vertical and horizontal plates, and with these preparations the welding operation can commence.

The shielding gas is supplied and the electrical circuitry required for the welding operation is also set into operation with the motors 2 and 23 being energized. In this way, the carriage means 1 will move to the left, as viewed in FIG. 1, while the wire 28 is fed to the welding path and forms the fillet weld. In this way, the automatic welding operations are carried out.

If there are any irregularities along the weld path, the rollers 3 will sense these irregularities and as a result of the connection 10, 11 between the bracket means 7 and the support means 27 it is possible for the entire support means 27 and all of the structure carried thereby to move up and down along the rods 10 in order to enable the entire structure to accommodate itself to any irregularities which are encountered. In this way, the path which is to receive the weld can be automatically followed by the welding unit and a completely automatic welding operation takes place in a fully reliable manner. The switch-actuator 18 has previously been positioned at the location which determines the end of the welding operation, so that when the switch 17 reaches the actuator 18, the required length of weld has been deposited and the apparatus automatically stops to terminate the welding operation.

Because of its light weight, the apparatus is portable and as soon as the drives are turned off and the magnets 6 de-energized, it is possible for the operator to move the portable welding apparatus to any desired location. While the above example has described fillet welding of mutually perpendicular plates, it is to be understood that the automatic welding apparatus of the invention is not limited to this type of welding. Ordinary horizontal butt welding can be carried out by adjusting the bracket means 7 on the carriage means 1, in the manner described above, so that the nozzle 4 extends vertically and is situated directly over a pair of horizontal plates which are being butt welded to each other at their adjoining edges. Also, it is possible to carry out the welding operations using flux instead of a shielding gas.

The manner in which the guide rail means 5 and a pair of end frame means 26 coact is illustrated in detail in FIGS. 3–5. Assuming that the right end frame means 26 of FIG. 1 is fixed to one end of the rail 5, then the construction shown in FIGS. 3–5 may be considered as forming part of the left end frame means 26 of FIG. 1. However, it is to be understood that if desired, the structure can be duplicated at both of the end frame means 26. Referring to FIG. 3 it will be seen that at its upper portion, the end frame means 26 is formed with a horizontal through-bore of square cross section receiving the rail 5 which is of octagonal section and formed along its bottom surface with the teeth which provide the rack 21 referred to above. Thus, the rail 5 extends freely through the bore of the leg structure 26 and has a sliding fit therein. This bore 34 of the leg assembly 26 shown in FIG. 3 extends horizontally through the upper cylindrical portion of the assembly 26, this cylindrical portion 35 being in the form of a cylindrical boss or projection integral with the pair of legs which form the assembly 26. As is apparent from FIG. 4, the cylindrical enlargement 35 of the assembly 26 extends to a greater extent to the right beyond the legs of the assembly than to the left. At the right of the legs, as viewed in FIG. 4, the cylindrical enlargement or boss 35 is formed with a lower transverse groove which extends horizontally through the projection 35 and upwardly from the bottom thereof into communication with the bore 34. Within this horizontal groove is located a swing-lever 37. This lever 37 is formed at its inner end with a bore receiving a pivot pin 38, and the pin 38 extends through a suitable axial bore of the boss 35 so as to extend across the groove which receives lever 37 with the pivot 38 extending through the bore of the lever 37 so that the latter is in this way supported for swinging movement around the axis formed by the pivot 38. It is to be noted that the upper portion of the cutout formed in the boss 35 and communicating with the opening 34 thereof is made sufficiently great to accommodate not only the lever 37 but also the toothed rack portion 36 which is fixed to the lever 37. This structure is situated in a cutout of the boss 35 which is sufficiently great to provide for free swinging of the lever 37 around the pivot 38 to an extent sufficient to displace the toothed portion 36, which is fixed to the lever 37, into mesh with the rack 21 as well as out of mesh with the latter to an extent sufficient to provide for free movement of the rail 5 and boss 35 axially one with respect to the other. The boss 35 is also formed with an inclined bore having a top open end and communicating at its bottom end with the cutout of the boss 35 which accommodates the lever 37. Within this bore is located a compressed coil spring 39 which presses at its bottom end against the lever 37, the latter having a short pin situated within the bottom end of the coil spring 39. At its upper end the coil spring 39 presses against an adjusting screw 42 which is threaded into the inclined bore of boss 35 and which is accessible at the upper forward part thereof so that by applying the tip of a screwdriver to the screw 42, the position of the latter along the bore can be adjusted to adjust the compressive force of the spring 39. In this way, the spring 39 urges the lever 37 in a counterclockwise direction about the pin 38, as viewed in FIG. 3, to urge the teeth 36 out of engagement with the rack 31. Thus, the spring 39 urges the lock formed by assembly 36, 37 away from its locking position.

In order to hold the lock 36, 37 in its locking position, a cam lever 40 is provided. This cam lever has an inner cam end 41 received in the cutout or groove formed in the projection 35 and bearing against the lower surface of the lever 37. This cam lever 40 is swingable about a pivot which also extends across the groove formed in the projection 35 and through a bore in the lever 40. At its front free end the lever 40 has a knob or button which can be readily engaged by the operator.

This assembly is shown in its locked position in FIG. 3. In order to unlock the assembly, the operator simply raises the lever 40, turning it in a clockwise direction, as viewed in FIG. 3. The result is that the spring 39 can expand to displace the lock 36, 37 away from the rack 21 and thus unlock the end frame means 26 from the rail means 5. Now these latter units can be freely moved axially one with respect to the other. When the desired position of these components one with respect to the other has been reached, the operator need only push downwardly on the knob or button at the free end of the cam lever 40. The result is that the cam 41 will push the lever 37 back up to its locking position where the teeth 36 mesh with the rack 21, and now the components will be releasably held in a fixed relation with respect to each other.

As has been pointed out above, while this construction can be provided for both of the end frame means 26, it is preferred to fix one of the end frame means 26 to the rail 5 and to provide the structure of FIGS. 3–5 only for the other of the end frame means 26.

It is thus apparent that the above-described structure provides a light, portable welding apparatus for carrying out precise welding operations in an automatic and simple manner. Once the bracket means 7 is fixed at a properly adjusted angular position with respect to the carriage means 1, so that the required welding operation can take place properly, it is only required to energize the electromagnets 6 so as to hold the welding apparatus set in a proper position for efficiently carrying out the automatic welding. During the welding operations, the welding nozzle 4 will automatically follow any irregularities or unevenness of the welding path because of the guiding provided by the rollers 3 and the free movability of the support means 27 at its block 11 along the rods 10 of the bracket means 7. Therefore, precise welding operations are carried out even where an irregular welding path is encountered. In addition, it is to be noted that exchanging of welding rods, required with manual or gravity welding, are unnecessary with the automatic structure of the invention because the wire 28 is continuously fed to the welding path by the above-described wire-feeding means, so that this feature also contributes to the efficiency of the welding operation.

It is apparent from the above description that the bracket means 7, by way of the rods 10, serves to guide the support means which includes the block 11 for free movement along a straight line toward and away from the welding path, the rods 10 extending parallel to this straight line. Moreover, the bolt 8 forms an adjusting means for adjusting the inclination of the straight line along which the support means is guided for free movement toward and away from the welding path, this bolt 8 serving by the releasable clamping action achieved thereby to releasably clamp the bracket means 7 at a selected angular position which will determine the inclination or angle of the straight line along which the support means is freely movable toward and away from the welding path.

It is to be noted that with the structure of the invention, not only do the guide rollers 3 contribute to the efficient guiding of the apparatus in order that it will automatically accommodate itself to any irregularities, but in addition, these rollers 3 support part of the weight of the welding apparatus, so that it is unnecessary to provide guide rails and end frames 26 which are excessively large and heavy, as would be essential if the entire weight of the welding apparatus were to be supported by these components during the welding operations. Furthermore, the mechanism which drives the carriage means 1 along the rail 5, the wire-feeding means, and the guide roller assembly are all exceedingly compact and simple so that the entire welding apparatus is surprisingly small. Thus, with the welding apparatus of the invention, the guide rail means is supported by the leg structures 26 with the carriage 1 supporting through the support means 27 the welding unit which includes the nozzle 4 as well as the wire-feeding means described above and the other components required for the welding operations, the feed of the welding unit along the weld path being carried out very simply by the coaction of the driving pinion with the rack formed along the guide rail itself. It is to be noted that it is possible to prevent any undesired bending of the guide rail 5 as a result of the weight which it carries by properly shifting one or both of the end frame means 26 along the rail so that between the pair of end frame means 26 the rail 5 has a length sufficiently short to efficiently carry the welding structure without any possible bending of the rail 5.

We claim:

1. In an automatic welding apparatus, a welding unit for forming a weld from wire fed to said unit, guide means situated in advance of said welding unit for guiding the latter along a path for receiving a weld formed from the wire fed to said unit, feeding means for feeding wire to said unit, support means supporting said guide means, said welding unit, and said feeding means, bracket means carrying said support means and guiding the latter for free movement along a straight line toward and away from the path which receives the weld so that said guide means together with said support means, welding unit, and feeding means are freely movable toward and away from said path when encountering any irregularities therealong, carriage means carrying said bracket means, elongated rail means extending generally parallel to said path and supporting said carriage means for movement generally parallel to said path, a pair of end frame means supporting said rail means at a given elevation, drive means carried by said carriage means and coacting with said rail means for driving said carriage means therealong for automatically distributing a weld along said path, and adjusting means operatively connected with said bracket means for adjusting the angular position thereof on said carriage means so as to adjust the inclination of said straight line along which said support means is freely movable toward and away from the path which receives the weld.

2. The combination of claim 1 and wherein said rail means is in the form of a single guide rail.

3. The combination of claim 2 and wherein the pair of end frame means include at least one supporting leg assembly having a portion formed with an opening which receives said guide rail.

4. The combination of claim 3 and wherein said guide rail is formed with teeth at least in the region of said portion of said supporting leg assembly, the latter carrying at said portion thereof a swingable lever having complementary teeth to mesh with the teeth of said rail for locking said supporting leg assembly at a selected location along said rail.

5. The combination of claim 4 and wherein a cam is turnably carried by said supporting leg assembly at said portion thereof for engaging said lever to releasably hold the latter in a position where the teeth carried by said lever mesh with the teeth of said rail.

6. The combination of claim 5 and wherein a spring means urges said lever and said teeth thereof away from said rail when the cam releases the lever for movement away from said rail.

7. The combination of claim 1 and wherein said rail means is in the form of a single elongated guide rail having rack teeth distributed therealong, said drive means including a motor carried by said carriage means and rotating a pinion which meshes with said rack teeth.

8. The combination of claim 7 and wherein said carriage means is in the form of an elongated body formed with a bore through which said rail extends.

9. The combination of claim 1 and wherein said adjusting means includes a clamp releasably clamping said bracket means to said carriage means so that the angular position of said bracket means with respect to said carriage means can be adjusted.

10. The combination of claim 9 and wherein said bracket means includes a pair of elongated rods extending parallel to said straight line, and said support means including a block formed with bores through which said rods extend so that through said block and rods said support means is slidably supported for free movement along said straight line toward and away from the path along which the weld is to be distributed.

11. The combination of claim 10 and wherein said wire-feeding means includes a motor and feed rollers carried by said support means, said feed rollers being actuated by said motor for feeding a wire to said welding unit, and said guide means including rollers for rolling along said path, said motor of said wire-feeding means carrying a support which carries said rollers.

* * * * *